United States Patent [19]

Yamamoto et al.

[11] Patent Number: 4,811,802
[45] Date of Patent: Mar. 14, 1989

[54] METHOD AND APPARATUS FOR CONTROLLING A CAPSULE FILLING MACHINE

[75] Inventors: Taizo Yamamoto, Osaka; Hirokazu Konishi, Sakurai; Yoshihisa Kawaguchi; Yoshizumi Ohnishi, both of Kashihara, all of Japan

[73] Assignee: Nippon Elanco Kabushiki Kaisha, Osaka, Japan

[21] Appl. No.: 200,414

[22] Filed: May 31, 1988

[30] Foreign Application Priority Data

Jun. 11, 1987 [JP] Japan .................. 62-146144

[51] Int. Cl.⁴ .......................................... G01G 19/52
[52] U.S. Cl. .................................. 177/1; 177/50;
                                                73/863.91
[58] Field of Search ....................... 177/50, 1, 145;
                                         73/863.91, 863.92

[56] References Cited

U.S. PATENT DOCUMENTS

| | | | |
|---|---|---|---|
| 3,744,582 | 7/1973 | Withnell et al. | 177/50 |
| 4,223,751 | 9/1970 | Ayers et al. | 177/50 X |
| 4,640,376 | 2/1987 | Hinzpeter | 177/50 |

FOREIGN PATENT DOCUMENTS

0194505A2  9/1986  European Pat. Off. .
62-64702   3/1987  Japan .
62-176452  8/1987  Japan .

*Primary Examiner*—George H. Miller, Jr.
*Attorney, Agent, or Firm*—Cushman, Darby & Cushman

[57] ABSTRACT

A metering operation in a capsule filling machine is controlled based on a correction signal derived from capsules just filled with material and ejected therefrom, by sampling/weighing these capsules, and by processing the weighed value to generate correction signal wherein: a first step of sampling/weighing is performed at the start-up stage of the capsule filling machine by collectively weighing a plurality of capsules sampled in bulk at once, and the second step of sampling/weighing is performed in subsequent steady operation stage by individual weighing each capsule from the bulk one by one.

An apparatus for performing the method has a sampling chute bifurcated in alternatively switchable two paths; i.e., a direct path and a controlled path, which share a common terminal i.e., a scale pan of a balance. The first step of sampling/weighing is performed in the direct path to the pan and then said second one is made through the controlled path having a gate means which permits intermittent and individual passage of capsules.

9 Claims, 3 Drawing Sheets

METHOD AND APPARATUS FOR CONTROLLING A CAPSULE FILLING MACHINE

FIELD OF THE INVENTION AND RELATED ART STATEMENT

1. Field of the Invention

The present invention relates to a system and method for controlling a capsule filling machine. In particular, it is concerned with a method and an apparatus for the controlling metering operation which are in parallel and related use with an automatic capsule filling machine for powdery or granular material.

2. Description of the Related Art

Heretofore, the adjustment of quantity of the material to be filled in capsule has primarily been made based on the actual measurement value of the filled capsule and an example of such an adjustment is disclosed in Japanese Unexamined Published Patent Application No. 64,702/87.

In the Japanese Published Unexamined Patent Application (Japan Kokai) No. 64,702/87 (hereafter is referred to as prior art), there is disclosed a capsule filling machine wherein powdery material is press-formed by a plunger to an aggregate to be contained in a capsule. The machine has an appended apparatus composed of a sampling means and automatic weight means placed in the vicinity of an outlet from which capsule products are ejected, a processing and controlling means for calculating the weight value derived from the automatic weighing means and for generating an instruction signal when a result of comparison of the weighed value with a preset reference value gives a deviation outside a preset range, and a means for adjusting the vertical limit, i.e., the upper/lower extremes, which are imposed on vertical reciprocating movement of the plunger, by receiving said signal.

Although the prior art does not explicitly disclose details of means for adjusting the vertical limits imposed on the reciprocating movement of the plunger, the adjustment is deemed to be carried out to adjust pressure of the plunger which compresses the powdery material in dies of the metering disk responding to the instruction signal.

In this prior art, there is disclosed at least an idea of processing the result of the weighing value derived from the automatic weighing means, comparing the processed value with the preset reference value, generating an instruction signal when the deviation in the comparison value is outside the present scope, and utilizing the signal for the adjustment of the vertical limit imposed on the reciprocating movement of the plunger.

The idea can be embodied in monitoring and maintaining a capsule filling machine in its stable steady state, though it is hardly utilizable in dealing with such transient situations as the start-up of the machine. At the start-up of actual operation of the capsule filling machine, production of great number of defective capsule products, such as an empty capsule or an insufficiently-filled capsule, is found remarkable by possible troubles involved in the preparatory works for the start-up operation, and these defective products must be discarded in bulk for every sampled lots.

Even if an individual weighing and comparison processing of the weighed value are repeated for deriving the deviation in such a situation, it is difficult to have control over the operation of a filling machine of high capacity and speed.

Meanwhile, the result of the adjustment based on a force of the plunger which compresses the powdery material in dies of the metering disk, referred in the prior art and deducible therefrom, is considered to reflect a quadratic conversion. Such conversion has a drawback of failing to follow the control with sufficient correspondence to the instruction signal outsides a certain region. That is, in FIG. 4, which is a reproduction of the drawing disclosed in the prior art, the vertical reciprocating movement of the plunger is adjusted to a state of at least one of respective stations of I through V. The adjustment of the vertical reciprocating movement of the plunger necessarily relates to the pressure and has to be a quadratic one which results in an adjustment of warped ceiling.

OBJECT AND SUMMARY OF THE INVENTION

It is therefore the primary object of the present invention to provide a reliable system for controlling metering operation in a capsule filling machine.

It is another object of the present invention to provide a method for the controlling by supplying an appropriate correction signal to the machine.

It is further object of the present invention to provide an apparatus for the controlling capable of generating correction signal suited for the machine.

These and other objects of the present invention and the attendant advantages thereof will be described in more detail by way of example illustrated in the appended drawings.

DESCRIPTION OF THE PREFERRED EMBODIMENTS

Figure 1:
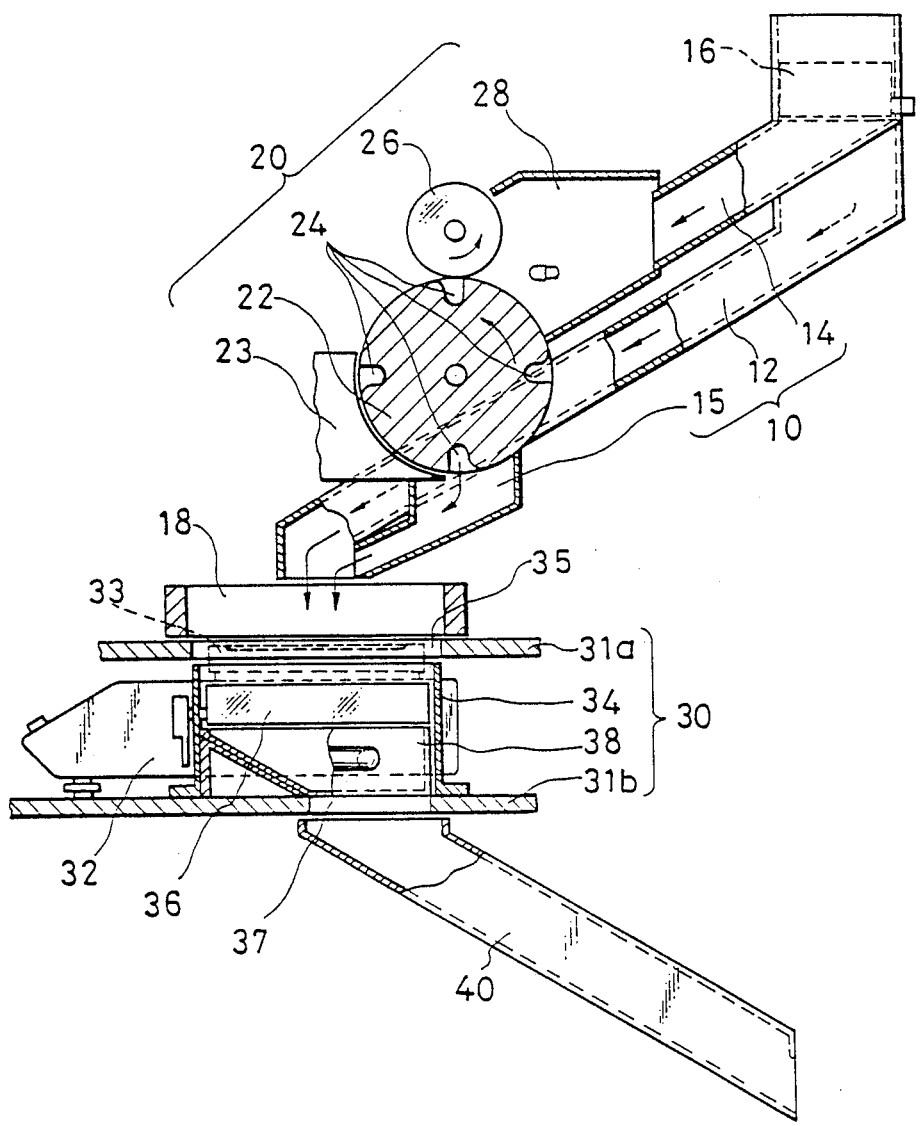
FIG. 1 is a front elevation of an example of the apparatus built in accordance with the present invention, with its essential parts cut-out for illustration.

According to the present invention, there is provided in a method for controlling metering operation of a capsule filling machine, based on a correction signal derived from capsules filled with material in the machine and ejected therefrom. The signal is produced by sampling and weighing the filled capsules, and processing the weighed value to generate the signal. The method comprises; performing two kinds of sampling-/weighing steps aslectively and in sequence, a first one being collective weighings of plurality of capsules sampled at once in bulk, and a second one being individual and intermittent weighings of each capsule from bulk one by one.

In embodying the present invention, it is preferable to adopt the first step of collective weighings of a plurality of capsules sampled at once in bulk at the start-up stage of the capsule filling machine and the second step of individual and intermittent weighings of each capsule from the bulk is performed after entering steady operation stage of the machine.

It is preferred to carry out the metering operation in the capsule filling machine by slicing the exposed top part of the aggregated powder which has once been press-formed into a cylindrical body in a die of a metering disk of the machine and has then been pushed up over the upper surface of the metering disk to be exposed. The reason why is that the results of the adjustment made by the above-mentioned process can reflect a liner conversion and the metering is capable of following the control with sufficient correspondence with the correction signal.

The metering operation was disclosed by the present inventors in Japanese Patent Application No. 19,261/86, which is a counterpart of Published European Patent Application No. 0 194 505. A similar method had been in customary use in tabletting machines, but was first with respect to the capsule filling machines.

The present invention may successfully be applied to the metering operation in the capsule filling machine which is performed by varying a capacity of a metering chamber formed on a metering table of the machine. The metering method is particularly suited for filling granular material to hard gelatin capsules and its operation was disclosed by the present inventors in a copending United States application of the even filling date of the same assignee, which is a counterpart of Japanese Patent Application No. 153,034/87 (not published yet).

The present invention may also be applied to such a metering operation in the capsule filling machine that is performed by varying cylinder/plunger displacement of a pumping unit related to the machine. The metering method is particularly suited for filling liquid substance to hard gelatin capsules, and its operation was disclosed in the Published EPA No. 0 194 505.

The apparatus for controlling a metering operation of a capsule filling machine in accordance with another aspect of the present invention operates in a manner that capsules filled with material in the machine and ejected therefrom are sampled and weighted on a scale pan of a balance, and the weighed values are calculated to generate a correction signal for controlling the metering operation.

The apparatus comprises the following means;

(a) a sampling chute bifurcated into alternatively selectable two paths, both of which are for leading the capsules to the scale pan of the balance, the first path reaching the pan directly and the second path reaching the same through a gate means which permits intermittent and individual passages of capsules one by one, (b) a connecting chute positioned adjacent to the balance which has an inlet open at approximately the same horizontal level with the scale pan of the balance, and (c) a wiper means which brushes the capsules on the scale pan of the balance and leads them to the inlet of the connecting chute, in synchronism with a sampling signal and/or signal for actuating the gate means.

At least one or both of the samping chutes is preferably a duct inclined by from about 30° to 60° with respect to the horizontal plane. The inclination can serve to control the gravitational running speed of the capsule, to alleviate the impacts on other components and to avoid possible damage of the products.

As the gate means for intermittent and individual passage, that which can be exemplified as the typical of gate means includes a combination of the followings;

(a) a sampling roller having an outer circumferential face provided with pockets for individual holding each of capsules therein while leaving intervals therebetween, (b) an auxiliary roller having a plain and smooth outer circumferential face, contacting said sampling roller and rotated in synchronism with the latter, and (c) means for intermittently driving both of said rollers to rotate.

The gate means should not necessarily be limited to the above-disclosed one, and any other mechanism may optionally be employed as far as it permits the intermittent passage of the capsule one by one.

The lower half of the sampling roller may preferably be covered by a circular guide plate with a small clearance between in order to avoid possible flyaway of the capsule from the pockets. This may alternately be achieved by embodying a small and obvious improvement on the configuration of the lower part of the sampling chute.

Furthermore, a drawer type sample box may be provided detachably adjacent to said connection chute, and a changing-over means for selecting one path for directing the capsule to an exhaust chute or another path to the sample box may also be provided in the vicinity of the inlet of the connecting chute.

The provision of these components enables an operator to visually inspect the capsule products recovered on the sample box.

By embodying the present invention, adjustment on the quantity of the material actually filled in the capsule is performed in a mode most suited for the actual state of operating the filling machine. In short, an optimum adjustment for every aspects of the operation will be made possible. In a preferred mode of operation, a mean value, which is based on the weighed values for all of a plurality of capsules sampled in bulk, is mainly used for driving the metering mechanism of the filling machine at the transient state of the start-up. And the result derived from the mean value, as well as other values including deviation obtained by weighing each capsule from the sampled bulk individually and sequentially, is used for the driving in steady state operation.

In contrast to this, the conventional manner of control has required much time and labor. For instance, at the start-up stage of the operation, an odd period from one to two minutes have to be spent until the filling quantity reaches a normal value and all of the filled capsules produced during the period have to be directed to a container for defective products. Then a sampling is made and the capsule filling machine is stopped temporarily at a time when an operator reasonably and empirically presumes, to his discretion, that the machine operates normally. After the filling quantity is confirmed to be within a predetermined control range by a balance for process control, the container is replaced by another container for conforming products and the operation of the machine is resumed.

In an apparatus disclosed in the Published European Patent Application (EPA) No. 0 194 505, the number of capsule sampled at one time is 50, and at the start-up of the operation, the automatic weighings for the said 50 capsules are repeated only to reject the insufficiently filled products while a gate for defective product is open. And, when the filling quantities reach the normal value, the gate for the defective products is closed and that for the conforming products is open, while the operation of the machine continues. The mode of weighing is changed over to the previously described individual weighing path, thus the smooth transition of the machine to its normal or steady operation will be assured. All of these operation can be controlled collectively by a single microprocessor.

The present invention is advantageous in that it has made a safe and stable operation, enabling full-automatic and unattended one.

EXAMPLE

1. Structure

Figure 2:
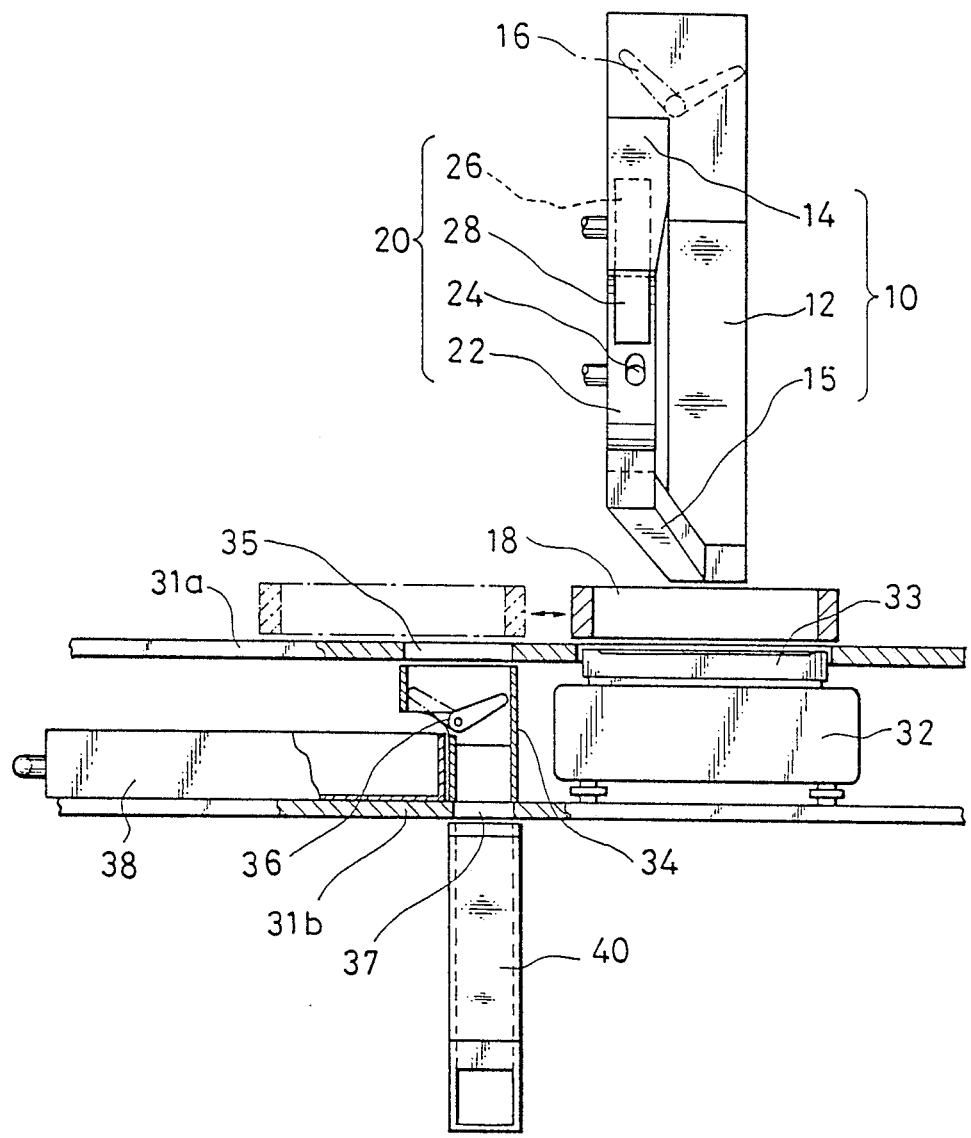
FIG. 2 is a side elevation of the apparatus as shown in FIG. 1 as seen from right hand thereof.

The apparatus shown in FIGS. 1 and 2 is designed to be installed adjacent to a capsule filling machine, which may be of any conventional known type and is therefore omitted from the illustration.

In the apparatus, a sampling chute 10, which is capable of being connected to an exhaust chute of a capsule filling machine and from which filled capsule products are ejected, is bifurcated to a direct path 12 and a controlled path 14/15, which may be selected alteratively by a change-over shutter 16.

The direct path 12 brings all of the supplied capsule products to a scale pan 33 of a balance 32 at once and is a linear duct arranged with an appropriate slope. The controlled path 14/15, which shares a starting point and a terminal point with the direct path 12, is divided by a space occupied by a gate means 20 into an upper path 14 and a lower path 15. The upper path 14 brings the capsules to a waiting chamber 28 while the lower path 15 communicates to the scale pan 33.

The gate means 20 includes a sampling roller 22. an auxiliary roller 26, guide plate 23 and the waiting chamber 28. On the outer circumferential face of the sampling roller 22, pockets 24 are provided while leaving spaces therebetween (in the drawing, 4 pockets are arranged with equal spaces). Each of the pockets 25 is a recess of peculiar shape structured to be capable of accomodating just one capsule.

A weighing room 30 is a space formed between two of the horizontally placed plates 31a and 31b and houses the balance 32, a connecting chute 34 and sample box 38. The balance 32 is placed so that its scale pan 33 can just be accomodated by an opening provided on the horizontal plate 31a and that the upper surface of the scale pan 33 be in the same level as that of the horizontal plate 31a.

The connecting chute 34 connects another opening 35 provided on the horizontal plate 31a with that 37 on the plate 31b and leads the weighed capsules primarily to an exhaust chute 40. By providing a changing-over shutter 36 in the vicinity of the inlet thereof, the connecting chute 34 can alternately lead the weighed capsules to sample box 30.

A wiper means 18 is a ring-shaped or annular cylindrical means capable of reciprocating movement in the direction indicated by an arrow on the horizontal plate 31a to brush off the weighed capsules on the scale pan 33 and to bring them to the opening 35.

2. Operation

In the previously disclosed arrangement of the apparatus, the sampling chute 10 receives supplies of the filled capsules of a predetermined number from a capsule filling machine having a metering means to be controlled in accordance with sampling signal which may be generated from time to time. The predetermined number may be the number of capsules corresponding to that in a unit segment of the capsule filling machine and usually is from 12 to 50. At the time of the sampling, if the changing-over shutter 16 selects the direct path 12, the every capsules would be brought to the scale pan 33 immediately. And, if it selects the controlled path 14/15, the capsules are lead to the waiting chamber 28.

The sampling roller 22 and auxiliary roller 26 sense this filled situation of the waiting chamber 28 to rotate intermittently in the directions indicated by arrows. The capsules once accomodated in the waiting chamber 28 are picked up by the pockets 24 one by one, and after being rotated for about half turn, are brought to the scale pan 33 through the lower path 15.

A signal generated by sensing the completion of the weighing of the scale pan 33 drives the wiper means 18 as previously mentioned, to brush the capsules off to the opening 35 and down into the connecting chute 34, and then into the exhaust chute 40 through the opening 37. If the changing-over shutter 36 is manipulated to occupy a position indicated in FIG. 2 by a dotted line, the capsules would be recovered in the sample box 38 of the drawer-type for enabling one visual inspection. The previously-described weighed value is transmitted to a processing apparatus, wherein a recognition of abnormal values by presumption, discarding of the abnormal values, a calculation of means values, and a derivation of deviation by comparing the values with the preset reference value are performed to generate a correction signal for controlling the capsule filling machine.

Figures 3A, 3B, 3C, 3D:
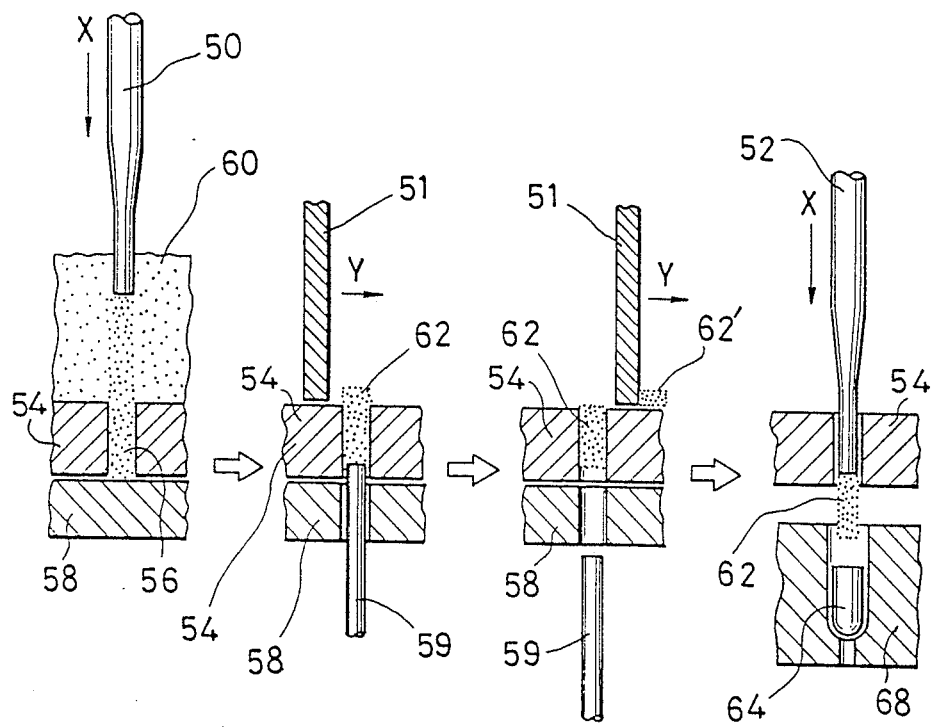
FIGS. 3A–3D are schematic views of an example of a metering means of a capsule filling machine which is suited for being controlled by an embodiment of the present invention.
Figure 4:
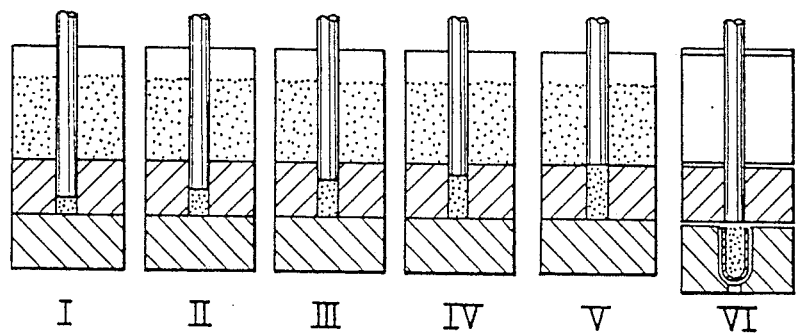
FIG. 4 is a reproduction of a schematic view of a metering means disclosed in Japanese Unexamined Patent Publication No. 64,702/87.

FIG. 3 is a reproduction from the drawings disclosed in the Published EPA No. 0 194 505 by the present inventors and schematically indicates an example of a metering means in a capsule filling machine, which is suitable for parallel use in combination with the embodiment of the present invention. FIG. 3 includes schematics of the final stage of compression station (A), the metering station (B-C) and the delivering station (D). Each of the function of these stations will be briefly described in the followings.

Namely, as a result of repeated compressing motions of the compressing plunger 50 in the direction indicated by an arrow X in the compressing station (A) including its precedent stages, the powdery material 60 in the die 56 of the metering disk 54 is compressed to have a fixed form, to become an aggregate 62. During the compressing stages, the powder material 60 in the die 56 will not leak because a supplementary disk 58 is closely fixed under the metering disk 54.

At the metering station B, the aggregate 62 is pushed up by a push rod 59 capable of vertical reciprocating motion, and as a result, exposes its top part over the surface of the metering disk 54. The rotation of the metering disk 54 in exposed state makes a slicing of the exposed part 62' by a relative motion in Y-direction of the doctor blade 51, i.e., the lower end of the side wall skirt of the distribution hopper, when the metering disk further rotates to the next stage of the metering station C. After the slicing, the push rod 59 retracts down to its waiting position and permit the further rotation of the metering disk 54. The extent of compression of the aggregate 62 is sufficient to avoid its own gravitation from the die 56, even when the push rod 59 retreats.

At the delivery station D, the aggregate 62 which had been held by the metering die 56 is forced by the plunger 52 to gravitate down to a capsule body 64 in the waiting state.

In the previously stated metering operation, the previously described correction signal serves to adjust the upward stroke of the push rod 59 and is capable of linear adjustment because it has no relation to the magnitude of the pressing force of the plunger.

What is claimed is:

1. In a method for controlling a metering operation in a capsule filling machine based on a correction signal which is derived by sampling/weighing the capsules filled with material in the machine and ejected therefrom and by processing the weight value to generate the signal, the method which comprises; performing two kinds of sampling/weighing selectively and in sequence, the first one being collective weighings of a plurality of capsules sampled in bulk at once and the second one being individual and intermittent weighings of each capsule from the bulk one by one.

2. The method as claimed in claim 1, wherein the first step is performed at the start-up stage of the capsule filling machine and the second step is performed in steady operation stage of the machine.

3. The method as claimed in claim 1, wherein the metering operation in the capsule filling machine is performed by slicing the exposed top part of aggregated powder which has once been press-formed as a cylindrical body in a die of a metering disk of the machine and then pushed up over the upper surface of the metering disk to be exposed.

4. The method as claimed in claim 1, wherein the metering operation in the capsule filling machine is performed by varying a capacity of a metering chamber formed on a metering table of the machine.

5. The method as claimed in claim 1, wherein the metering operation in the capsule filling machine is performed by varying a cylinder/plunger displacement of a pumping unit related to the machine.

6. In an apparatus for controlling a metering operation of a capsule filling machine which operates in a manner wherein capsule filled with material in the machine and ejected therefrom are sampled and weighed on a scale pan of a balance and the weighed values are data-processed to generate a correction signal for controlling the metering operation, the apparatus which comprises;

(a) a sampling chute bifurcated in alternatively selectable two paths, both of which are for leading the capsules to the scale pan of the balance, the first path reaching the pan directly and the second path reaching the same through a grate means which permits intermittent and individual passages of capsules one by one, (b) a connecting chute positioned adjacent to the balance which has an inlet open at approximately the same horizontal level with the scale pan of the balance, and (c) a wiper means which brushes the capsule on the scale pan of the balance and leads it to the inlet of the connecting chute in synchronism with a sampling signal and/or signal for actuating the gate means.

7. The apparatus as claimed in claim 6 wherein at least one or part of said sampling chutes is a duct inclined by from about 30° to 60° with respect to the horizontal plane.

8. The apparatus as claimed in claim 6 wherein said gate means includes a combination of the following means:

(a) a sampling roller having an outer circumferential face provided with pockets for individual holding each of capsules therein while leaving intervals therebetween, (b) an auxiliary roller having a plain and smooth outer circumferential face, contacting said sampling roller, and rotated in synchronism with the latter, and (c) a means for intermittently driving both of said rollers to rotate.

9. The apparatus as claimed in claim 6 wherein a drawer type sample box is provided adjacent to said connecting chute, and a changing-over means for selecting either one path directing the capsule to an exhaust chute or another path to the sample box is provided in the vicinity of the inlet of the connecting chute.

* * * * *